(12) United States Patent
Henty

(10) Patent No.: US 8,627,374 B2
(45) Date of Patent: Jan. 7, 2014

(54) VIDEO CONTENT SEARCH SYSTEM AND METHOD WITH AUTOMATIC MULTI-TERM GROUPING AND SEARCH

(75) Inventor: David L. Henty, Newport Beach, CA (US)

(73) Assignee: I-Interactive LLC, Irvine, CA (US)

(*) Notice: Subject to any disclaimer, the term of this patent is extended or adjusted under 35 U.S.C. 154(b) by 0 days.

(21) Appl. No.: 13/588,887

(22) Filed: Aug. 17, 2012

(65) Prior Publication Data
US 2013/0041891 A1 Feb. 14, 2013

Related U.S. Application Data

(63) Continuation-in-part of application No. 12/536,356, filed on Aug. 5, 2009, now Pat. No. 8,250,609.

(60) Provisional application No. 61/137,980, filed on Aug. 5, 2008.

(51) Int. Cl.
*H04N 5/445* (2011.01)
*G06F 13/00* (2006.01)
*G06F 3/00* (2006.01)

(52) U.S. Cl.
USPC .............................. 725/53; 707/708

(58) Field of Classification Search
USPC ............................. 725/53; 707/708
See application file for complete search history.

(56) References Cited

U.S. PATENT DOCUMENTS

2004/0194141 A1* 9/2004 Sanders ..................... 725/53

* cited by examiner

*Primary Examiner* — Hunter B Lonsberry

(57) ABSTRACT

A search based video interface system and method is disclosed. Search results are dynamically filtered based on automatic combinations of search terms.

5 Claims, 3 Drawing Sheets

VIDEO CONTENT SEARCH SYSTEM AND METHOD WITH AUTOMATIC MULTI-TERM GROUPING AND SEARCH

RELATED APPLICATION INFORMATION

The present application is a continuation-in-part of U.S. patent application Ser. No. 12/536,356 filed Aug. 5, 2009 (U.S. Pat. No. 8,250,609), which claims priority under 35 USC 119(e) to provisional patent application Ser. No. 61/137,980 filed Aug. 5, 2008, the disclosures of which are incorporated herein by reference in their entirety.

BACKGROUND OF THE INVENTION

1. Field of the Invention

The present invention relates to TV interfaces and control systems and methods for controlling entertainment systems employing a TV as a display device. More particularly the present invention relates to systems and methods for search and display of TV accessible content.

2. Description of the Prior Art and Related Information

Modern TV based entertainment systems have the ability to access a large variety of content. Such content ranges from large numbers of digital TV channels, movies available through online pay per view or other subscription access services via cable or satellite, other online available media, as well as various locally stored media such as audio, pictures and video, and internet access. Accessing such content efficiently is impossible without employing a search feature of some type. At the same time TV interfaces are designed for ease of use with remote controls with well known control buttons, such as Up-Down-Left-Right (UDLR) and Select.

Search techniques of various complexity are known and in TV applications are typically kept simple due to the difficulty of text entry with remote controls. Usually a search category is selected and search results are displayed and scrolled through using the UDLR controls on the remote. For example, a search menu may lead to a category such as movies or sports and the search commences from there. This is easy to use with a remote control with UDLR inputs but requires the additional time to scroll through menu layers to get to the desired search category/field. This becomes more and more problematic as the number of field/categories increase making menus undesirably multi-layered and complex to navigate.

Accordingly a need exists for an easier way to search and display results in TV applications.

SUMMARY OF THE INVENTION

In one aspect the present invention provides a method for searching video content, comprising receiving plural search terms characterizing video content via text entry by a user, including at least three separate search terms, grouping at least one search term with plural other search terms to form plural separate search groupings from said search term and automatically inserting different search restrictions between different search terms to define search results. The method further comprises generating search results with video content satisfying said plural search restrictions as a single search.

In a preferred embodiment the method for searching video content further comprises displaying the search results for search restrictions having search results even if other search restrictions have no search results. Grouping at least one search term with plural other search terms to form plural separate search groupings from a search term preferably only groups search terms which are non-orthogonal with the search term. Generally, if N plus M search terms are entered, where the N and M terms are different classification levels of video content, and N×M separate searches are conducted as a single search. Typically, N and M are each two or greater.

Further features and advantages of the invention are set out in the following detailed description.

DETAILED DESCRIPTION OF THE INVENTION

Figure 1:
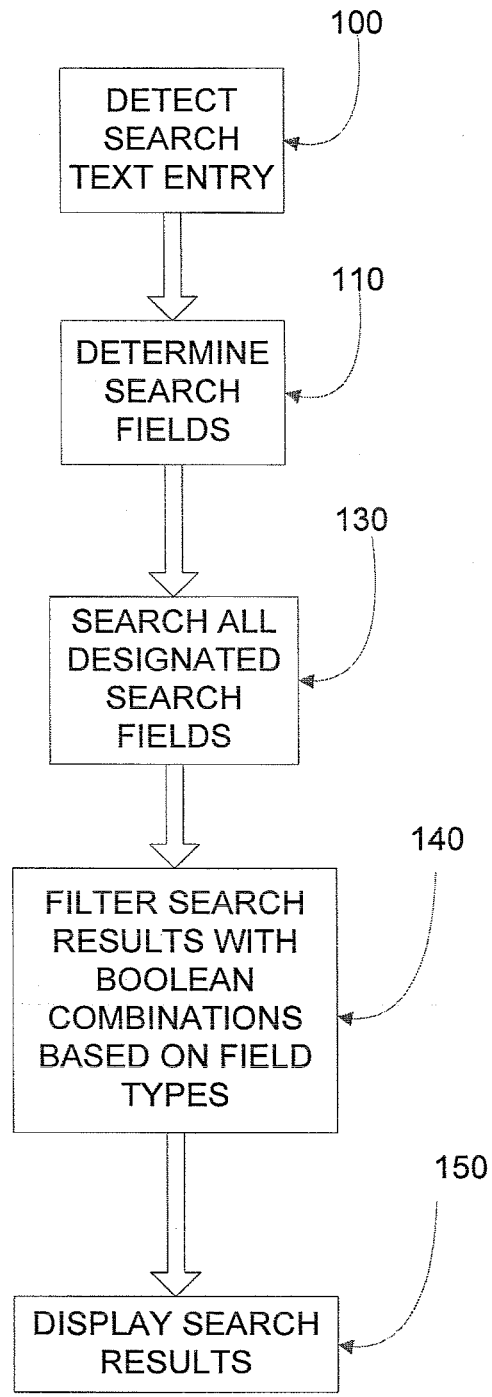
In FIG. 1 a flow diagram of a search control method in accordance with the invention is illustrated.

U.S. Pat. No. 6,094,156 ('156 patent) and U.S. Pat. No. 7,123,242 ('242 patent) are incorporated herein by reference in their entirety. Pending patent application Ser. No. 12/077,891 filed Mar. 21, 2008, Ser. No. 12/151,026 filed May 2, 2008, and patent application Ser. No. 12/080,535 filed Apr. 3, 2008, are also incorporated herein by reference in their entirety. In the above noted '156 and '242 patents a folding remote control system and method with a keyboard configured on the inner surfaces of the folding remote are disclosed. This system and method allows easy text entry when desired by opening the folding remote and using the keyboard within the remote. The remote also has conventional UDLR buttons on the outside of the remote allowing control of menus in a conventional manner. The present invention provides a TV interface and control method adapted for efficient and yet flexible searching using text entry which may advantageously employ such easy text entry to tailor a search for desired content and which can also create a flexible grid based display of content which can then be navigated by UDLR or other content surfing control. Also searching across different content types including time based content such as live TV channels and non time based content such as internet video or VOD may be provided with a single search and display.

Typically searching TV content is directed to focusing on a specific desired search result and conventional searches allow keyword searches or other specific fields to be searched directed to this end. The search results are then displayed in a list for selection. However in a TV setting searching is not a dominant manner of finding content and more typically a grid display is the primary method of finding content by "surfing" through an on screen channel guide in grid form using UDLR buttons. In another attempt to make accessing large amounts of TV content easier, many TV menu systems provide a number of category options which may alternatively be selected by going through a sequence of menu options. For example, a "sports" category may be selected and a listing of sports presented ("archery" . . . , "golf" . . . ) which can be selected and content viewed. Therefore, a viewer typically can choose from a search, a grid guide surfing selection, or a multi-layer category menu selection for going to a desired content. Each approach has its limitations and to use them all at various times requires a large number of menu layers and selection steps to be navigated. Clearly sometimes a very specific content item is sought, sometimes a whole category is of interest, and sometimes it is desired to "surf".

The multi-field search and display approach described herein allows flexibility to pursue all these options from a single search menu easily and quickly. Categories are searched for specific category terms along with more general search terms. Categories may be identified by simple entry codes (for example, a capital letter may signify a category and a lower case a general term) or simply by matching the category list with the search term. The former approach may advantageously use predictive category terms from one or two letters. Multiple category terms can be searched simultaneously along with other specific field terms and/or general (non-specific) search terms. Selective Boolean combinations of OR and AND are automatically provided between search terms. This allows the user to enter a relatively long search string without thinking about the logical structure of the search terms and entering appropriate AND and OR combinations.

At a first implementation level, category terms may be generally simply be treated as subject to an OR operation whereas non category terms are searched subject to an AND operation. A user may then easily generate a large list of results for subsequent "surfing" by use of category entries or narrow the results list by adding other terms if desired. As one example, terms may be searched for in the "title" and "description" fields using an AND along with the category OR based term search. This can quickly focus a broad search result list as desired by adding more terms. More or fewer fields may be searched in addition to the category field (for example just "title" or all fields). Typically TV content fields are relatively specifically defined and include the following:
Program title, eg 'The Simpsons'
Title language, eg 'English'
Sub-title or episode title eg 'The Zoo'
Program description eg 'Bart goes to the zoo and hurls things at the monkeys'
Program description language
Director
Actor (there can be multiple actors)
Writer (can be multiple)
Adapter
Producer
Presenter
Commentator
Guest (can be multiple)
Date finished (eg for a movie, '2003')
Category eg 'Soap', 'Comedy' (can be multiple)
Broadcast language
Original language
Length of the program
Icon
Country
Episode number
Video (yes/no [for radio programs])
Color (yes/no)
　Aspect, eg '4:3' or '16:9'.
Quality, eg 'HDTV', '800×600'.
Audio (yes/no)
Stereo (yes/no)
Previously shown (date—the last time the program was shown on TV)
New (yes/no)—usually means the first ever showing on TV
Premiere (yes/no)—usually taken to mean the first program in a series, but the series may have been shown previously
Last chance (yes/no)—usually taken to mean the network will no longer be repeating the program
Subtitles (teletext/onscreen/deaf-signed)
Rating (eg 'PG', 'R')
Star rating (eg '3/4', '2.5/5')

Although all the above fields may be searched the most useful will typically be "category", "title", "program description", "actor", "director", "date finished" and "star rating". (Typical categories are well known and a representative list is attached at the end of the description.) In one aspect, the search of all these fields could proceed by first identifying category terms in the search string and performing an OR based category field search followed by an AND based search using the non category terms in the search string for the remaining fields. If a field is searched with non standard entry codes, e.g., star rating, the search flow may first convert the user term to a code matching the guide data for the field, e.g., *** would be converted to 3/4 or 3/5.

In a further aspect, the category field search may also employ automatic selective Boolean searching. The category field contains a large number of terms, typically in the hundreds, ranging from high level terms such as "movie", "sports", "series" to more specific descriptive types of terms such as "action", "drama", "comedy", "horror", etc. Logical OR treatment of this field may therefore not be appropriate for all category term combinations. For example, the search "movie" "action" would be logically intended as an AND rather than an OR search. Therefore the category terms may first be grouped in classes and the separate groups treated differently as to Boolean search result handling, with some group combinations subject to AND treatment. As one example, a simple two level grouping may be employed with highest level category types such as "movie", "sports", "series" in one group and remaining lower level terms grouped together in a second group with intra group terms subject to OR handling and terms in different groups subject to AND treatment. To avoid anomalous results like an AND handling of say "sports" and "horror" in a search string "movies" "sports" "horror" the AND may be limited based on a further grouping of terms to identify generally orthogonal category terms and apply OR handling and AND handling otherwise.

In one approach to a more complex grouping of category terms, the grouping may identify category terms by a high level type and at a lower level by sub category or descriptor and apply OR handling of orthogonal terms. For example, SPORTS as a broad category type has a large number of sub-categories. The sub-categories (specific sports) are almost always orthogonal (or mutually exclusive); i.e., rarely if ever will a single televised sport event include two distinct sports. Therefore, logically a search with multiple sports sub-categories would almost always be an empty search so a Boolean OR can be presumed and automatically is inserted in the search to return either sport A or sport B and display both in the search results. Similarly, at a higher level categories such as SPORTS and MOVIES are generally orthogonal and can automatically be provided with a Boolean OR. Conversely, generally categories and related sub-categories or descriptors will not be orthogonal and a Boolean AND is presumed and inserted. For example a category such as MOVIES and a descriptor such as ACTION will be presumed as a logical AND and only "action movies" will be returned in the search. Although orthogonal categories will always be ORed, some groups of descriptors or sub-categories which are non-orthogonal may nonetheless be Boolean ORed based on predetermined analysis of their common usage. For example, ACTION and SCI-FI are not orthogonal but may be grouped for OR handling. It will be appreciated the degree of grouping and selective Boolean search handling can be made more or less complex depending on specific application and search resources.

The automatic Boolean search method is adapted for example for a cable TV, IPTV or satellite TV application and may allow for easy searching for a movie in an on demand setting or a TV program or channel from an extensive TV guide listing. Therefore, additional or different search field options may be employed from those described above. These may vary from e.g., VOD to TV guide searching to online video searching and selective Boolean searches may be separately provided for each class of content. For example, a search covering on line content may apply AND searching and automatically switch to the above selective category Boolean searching for VOD and guide searching.

As will be appreciated since multiple categories and/or general terms may be used to narrow the search as much as desired, a broad search or a narrow focused search may be easily provided. For a broad search a grid display truncated to the search results may preferably be provided as shown to allow surfing of the truncated guide as described in the "026 application incorporated herein by reference in its entirety. The search string may be long or short and may provide a wide variety of result patterns. The search string may be stored for future use, which may be done automatically or by user selection.

In an additional aspect the search string may include excluded terms or categories. E.g., a search entry "-violence" could exclude search results with the term violence in any of the fields of the program guide. A variety of such excluding search items and fields may be used including all the ones noted, e.g., –CO means no comedies, –DO no documentaries, –$ no PPV or VOD, etc. These will be automatically treated with a Boolean AND. This can effectively "prune" a large program grid more easily and quickly than requiring a term in many cases.

Therefore the multi-field search specifically allows either inclusive search parameters, excluding search parameters, or both in a single search string.

The invention is preferably used with keyboard text entry rather than UDLR entry and may use a keyboard enhanced remote as described in the above patents, but is not necessarily so limited.

Referring to FIG. 1 the interface control flow is illustrated. At 100 the search mode is entered, the search menu displayed and the search string detected. The search mode and menu displayed may be automatic as disclosed in U.S. provisional patent application Ser. No. 60/919,683 filed Mar. 23, 2007, and utility patent application Ser. No. 12/077,891 filed Mar. 21, 2008, the disclosures of which are incorporated herein by reference in their entirety. Alternatively the search mode and search menu display may be initiated by selection through a higher level menu. The device (disclosed in the above noted patents and applications incorporated herein by reference) displays the search menu (without the search results initially). A streamlined search menu may be superimposed on the menu or program being viewed when the signal is received in a partial screen window. Alternatively the streamlined search menu may be displayed full screen displacing the menu or program being viewed on the screen of TV. In either case at 100 the user enters text (or star codes or other search symbols) to initiate searching. At 110 the search fields are determined. This may be user settable or may be defaulted automatically to all fields or major fields as noted above. The guide information is then accessed at 130 and all designated search fields in the search string are searched. Depending on the format of the guide information this may involve converting different data sets for the different fields which are all searched at 130, such as star rating to field codes. At 140 the search results are filtered using selective Boolean AND and OR as discussed above. The search results are displayed at 150, for example, in any of the formats described in the '026 application. Although 130 and 140 are shown as separate it will be appreciated these may occur as part of the single search process rather than a separate filtering of results. The search results may be displayed immediately within the search menu window once text is entered with search fields being added as the search string progresses or alternatively the full search text may be entered before initiating the search (e.g., by enter or OK on the keyboard) and displaying the search results.

Figure 2:
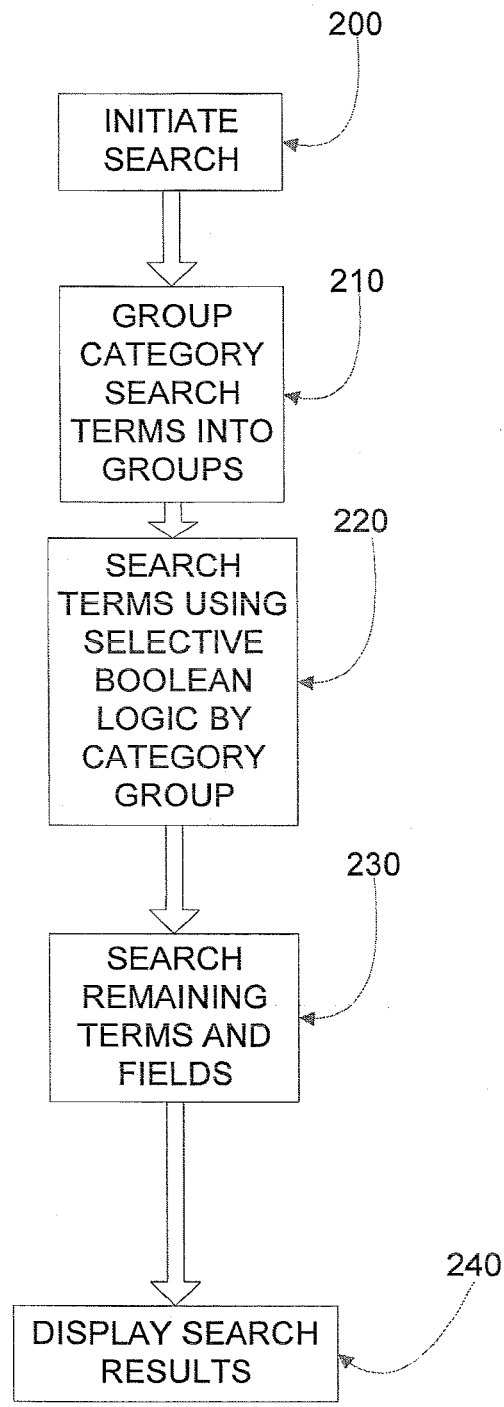
In FIG. 2 a flow diagram of a search control method in accordance with another embodiment of the invention is illustrated.

Referring to FIG. 2 a search and display flow are shown for an embodiment where multiple categories are in the search string and separated into groups which are selectively automatically ORed or ANDed as described above. The search process flow may proceed at 200 as before to initiate searching and define the plural search fields. At 210 the category search terms are grouped as described above with two or more groups to allow selective Boolean handling within the category field. At 220 the selective Boolean handling within categories is provided. At 230 the remaining fields are searched. At 240 the results are displayed. Any Boolean OR broad search results optionally may be displayed in separate lists as described in the '026 application. For example, the display could be based on alternative sports, e.g., baseball, football or basketball in three columns. This column based display of alternate search requirements may be a user selected option and may be included in the menu as a display option. Also the grouping may be displayed in the form of separate grids for each search field (for example one grid for movies and one for sports which grids may be separately navigated via UDLR or other surfing style control). Alternatively the display grouping may be a combination of one or more grids and lists based on grid display criteria described in the '026 application.

Figure 3:
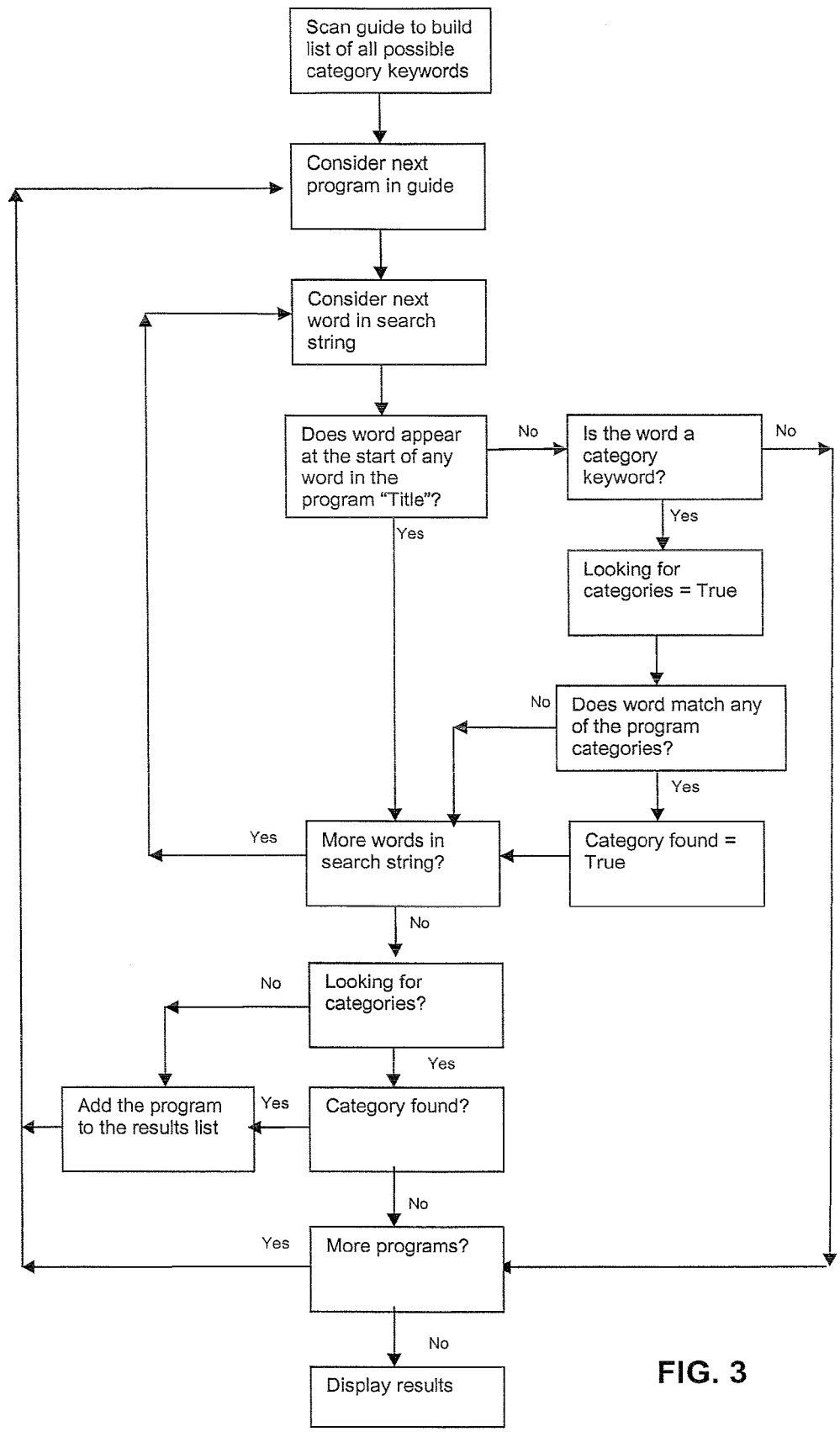
In FIG. 3 an example of a flow diagram of a search control method in accordance with one specific example embodiment of the invention is illustrated.

Referring to FIG. 3 a specific embodiment of one simple selective Boolean multi-field search is illustrated. In this example the category and title fields are searched with selective logic. Extension to the alternatives discussed above will be apparent to those skilled in the art.

As may be appreciated from the above the multi-field search approach gives the user tremendous flexibility to tailor the breadth of the search and the user may construct a very narrow search looking for a few specific results or a broad search designed to create a large base of results to "surf" via UDLR controls. A variety of specific category groupings are possible. Also, to display the results in an optimal manner the teachings of the above noted applications incorporated herein by reference may be employed.

It will be appreciated from the foregoing that another aspect of the invention provides the ability to automatically provide multiple search term groupings, in effect creating multiple searches, with a limited number of search terms. For example, a search with terms "movie", "series", "action", "drama", "comedy", "horror", would automatically group search restrictions "action", "drama", "comedy", "horror", with each of "movie" and "series" applying AND to each grouping and OR to the results. Also automatic grouping would preferably exclude any search restriction for orthogonal pairings, for example "horror" with "sports". Therefore, in this latter example, all movies and series of the noted sub-categories would be displayed along with all sports. Generally text entry of terms for search restrictions for N categories and M sub-categories could automatically create N×M separate search restrictions with all results displayed for easy surfing creating an instant personal guide. (As noted orthogonal pairings are however preferably excluded from the N×M search restrictions.) N and M may typically each be two or more creating a feature rich instant guide. More generally N and M may be different classification levels of video content, which may also be arranged as various levels and sub-levels in accordance with a desired classification scheme.

It will be appreciated by those skilled in the art that the foregoing is merely an illustration of the present invention in currently preferred implementations. A wide variety of modifications to the illustrated embodiments are possible while remaining within the scope of the present convention. Therefore, the above description should not be viewed as limiting but merely exemplary in nature.

Categories:
Paid Programming
Crime drama
Action
Adventure
Suspense
Series
Horror
Science fiction
Fantasy
Sports non-event
Martial arts
Boxing
Wrestling
Reality
Law
Crime
Comedy
Drama
Documentary
Extreme
Adults only
Sitcom
Entertainment
Historical drama
Comedy-drama
Western
Travel
Medical
Special
Biography
Bus./financial
History
Shopping
Home improvement
House/garden
How-to
Interview
War
Docudrama
Game show
Limited Series
Romance-comedy
Talk
Musical comedy
Music
Nature
Animals
Children
Science
Anthology
Environment
Religious
Art
Community
Consumer
Cooking
Educational
Variety
Fashion
Newsmagazine
Public affairs
Outdoors
News
Short Film
Animated
Dance
French
Miniseries
Exercise
Self improvement
Collectibles
Soap
Auto
Romance
Gay/lesbian
Sports talk
Computers
Equestrian
Politics
Performing arts
Health
Mystery
Musical
Music special
Theater
Awards
Hockey
Sports event
Holiday
Track/field
Running
Gymnastics
Football
Serial
Agriculture
Paranormal
Fundraiser
Parade
Standup
Pro wrestling
Fishing
Golf
Hunting
Motorcycle
Card games
Poker
Boat
Auto racing
Skiing
Snowboarding
Horse
Arts/crafts
Opera
Weather
Parenting
Watersports
Aviation
Motorsports
Children-music
Sumo wrestling
Rodeo
Basketball
Baseball
Drag racing Bowling
Dog show
Children-special
Surfing
Skateboarding
Skating
Holiday special
Soccer
Rugby
Playoff sports
Anime
Blackjack
Music talk
Diving
Intl soccer
Tennis
Children-talk
Holiday-children special
Mountain biking
Bicycle
Yacht racing
Snowmobile
Aerobics
Motorcycle racing
Holiday-children
Intl hockey
Darts
Billiards

What is claimed is:

1. A method for searching video content, comprising:
receiving plural search terms characterizing video content via text entry by a user, including at least three separate search terms;
grouping at least one search term with plural other search terms to form plural separate search groupings from said search term;
automatically inserting different search restrictions between different search terms and groupings to define search results; and
generating search results with video content satisfying said plural search restrictions and for plural groupings as a single search.

2. A method for searching video content as set out in claim 1, further comprising displaying the search results for search restrictions having search results even if other search restrictions have no search results.

3. A method for searching video content as set out in claim 1, wherein said grouping at least one search term with plural other search terms to form plural separate search groupings from said search term only groups search terms which are non-orthogonal with said search term.

4. A method for searching video content as set out in claim 1, wherein N plus M search terms are entered, wherein the N and M terms are different classification levels of video content, and N×M separate searches are conducted as a single search.

5. A method for searching video content as set out in claim 4, wherein N and M are each two or greater.

\* \* \* \* \*